US010699450B2

(12) United States Patent
Weissbrod et al.

(10) Patent No.: US 10,699,450 B2
(45) Date of Patent: Jun. 30, 2020

(54) INTERACTIVE TOOL FOR CAUSAL GRAPH CONSTRUCTION

(71) Applicant: International Business Machines Corporation, Armonk, NY (US)

(72) Inventors: Omer Weissbrod, Brookline, MA (US); Chen Yanover, Zichron Yaakov (IL); Lavi Shpigelman, Yaad (IL)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/718,355

(22) Filed: Sep. 28, 2017

(65) Prior Publication Data

US 2019/0096102 A1 Mar. 28, 2019

(51) Int. Cl.
*G06T 11/20* (2006.01)
*G06F 3/0482* (2013.01)
*G06F 3/0484* (2013.01)
*G06F 3/0481* (2013.01)

(52) U.S. Cl.
CPC ......... *G06T 11/206* (2013.01); *G06F 3/0482* (2013.01); *G06F 3/04817* (2013.01); *G06F 3/04847* (2013.01); *G06T 2200/24* (2013.01)

(58) Field of Classification Search
None
See application file for complete search history.

(56) References Cited

U.S. PATENT DOCUMENTS

| | | |
|---|---|---|
| 2016/0171383 A1 | 6/2016 | Narain et al. |
| 2016/0292248 A1 | 10/2016 | Garcia |
| 2017/0024652 A1 | 1/2017 | Kipersztok et al. |
| 2017/0332917 A1* | 11/2017 | Sarrafzadeh ......... A61B 5/0205 |

OTHER PUBLICATIONS

Wang et al. (The Visual Causality Analyst: An interactive Interface for Causal Reasoning, IEEE, vol. 22, No. 1, Aug. 20, 2015) (Year : 2015).*
Waldorp et al. (Effective connectivity of fMRI data using ancestral graph theory: Dealing with missing regions, 2010, Elsevier Inc.) (Year: 2010).*
Scutari (Learning Bayesian Networks with the Bnlearn R package, vol. VV, Issue II, 2009) (Year: 2009).*
Pearl (Casual Diagrams for Empirical Research, UCLA, 1994) (Year: 1994).*
Colombo et al. (Learning High-Dimensional Directed Acyclic Graphs with Latent and Selection Variables, The Annals of Statistics, 2012, vol. 40, No. 1, 294-321) (Year: 2012).*
Almeida et al. "Expert Bayes: Automatically Refining Manually Built Bayesian Networks." Machine Learning and Applications (ICMLA), 2014 13th International Conference on. IEEE, Jun. 10, 2014, 14 pages.

(Continued)

*Primary Examiner* — Kyle Zhai
(74) *Attorney, Agent, or Firm* — Stephanie L. Carusillo

(57) ABSTRACT

In an approach for constructing causal graphs, a processor receives data, a first set of constraints, and one or more graph parameters. A processor constructs a causal graph based on the data, first set of constraints, and one or more graph parameters. A processor generates an interactive display interface for the constructed causal graph. A processor refines the constructed causal graph using the interactive display interface.

17 Claims, 3 Drawing Sheets

(56) References Cited

OTHER PUBLICATIONS

Masegosa et al., "An interactive approach for Bayesian network learning using domain/expert knowledge." International Journal of Approximate Reasoning 54 (2013), pp. 1168-1181.
Kraaijeveld et al., "GeNleRate: An interactive generator of diagnostic Bayesian network models." In Working Notes of the 16th International Workshop on Principles of Diagnosis (DX-05), pp. 175-180, Monterey, CA, USA, Jun. 1-3, 2005.
Sucar et al.,"Interactive structural learning of Bayesian networks." Article in Expert Systems with Applications, Jan. 1998, DOI: 10.1016/S0957-4174(98)00050-5, 9 pages.
Wang et al., "The Visual Causality Analyst: An Interactive Interface for Causal Reasoning." IEEE Transactions on Visualization and Computer Graphics, 30(1), 2016. © IEEE, 9 pages.
Yet et al. "Not just data: A method for improving prediction with knowledge." Journal of Biomedical Informatics 48 (2014): pp. 28-37.
Cano et al., "A method for integrating expert knowledge when learning Bayesian networks from data." IEEE Transactions on Systems, Man, and Cybernetics, Part B Cybernetics, vol. 41 No. 5, Oct. 2011, pp. 28-37.
Bermejo et al. "Interactive learning of Bayesian Networks using OpenMarkov.", Sixth European Workshop on Probabilistic Graphical Models, Granada, Spain, 2012, pp. 27-34.

\* cited by examiner

INTERACTIVE TOOL FOR CAUSAL GRAPH CONSTRUCTION

BACKGROUND

The present invention relates generally to the field of causal graph construction, and more particularly to an interactive tool for causal graph construction.

In statistics, econometrics, epidemiology, genetics and related disciplines, causal graphs are graphical models used to encode assumptions about a data-generating process. Causal graphs can be used for communication and for inference. As communication devices, causal graphs provide formal and transparent representation of the causal assumptions that researchers may wish to convey and defend. As inference tools, causal graphs enable researchers to estimate effect sizes from non-experimental data, derive testable implications of the assumptions encoded, test for external validity, and manage missing data and selection bias.

The two basic units of which these graphs are constructed are vertices (i.e. nodes) and edges. Each edge has two vertices to which it is attached, called its endpoints. Edges may be directed or undirected, directed edges are also called arcs or arrows and undirected edges are also called lines. For example, an arrow (x, y) is considered to be directed from x to y; y is called the head and x is called the tail of the arrow; y is said to be a direct successor of x and x is said to be a direct predecessor of y. If a path leads from x to y, then y is said to be a successor of x and reachable from x, and x is said to be a predecessor of y. An undirected edge, or a line, has no direction and therefore can be bidirectional.

SUMMARY

Aspects of an embodiment of the present invention disclose a method, computer program product, and computer system for causal graph construction. A processor receives data, a first set of constraints, and one or more graph parameters. A processor constructs a causal graph based on the data, first set of constraints, and one or more graph parameters. A processor generates an interactive display interface for the constructed causal graph. A processor refines the constructed causal graph using the interactive display interface.

DETAILED DESCRIPTION

Figure 1:
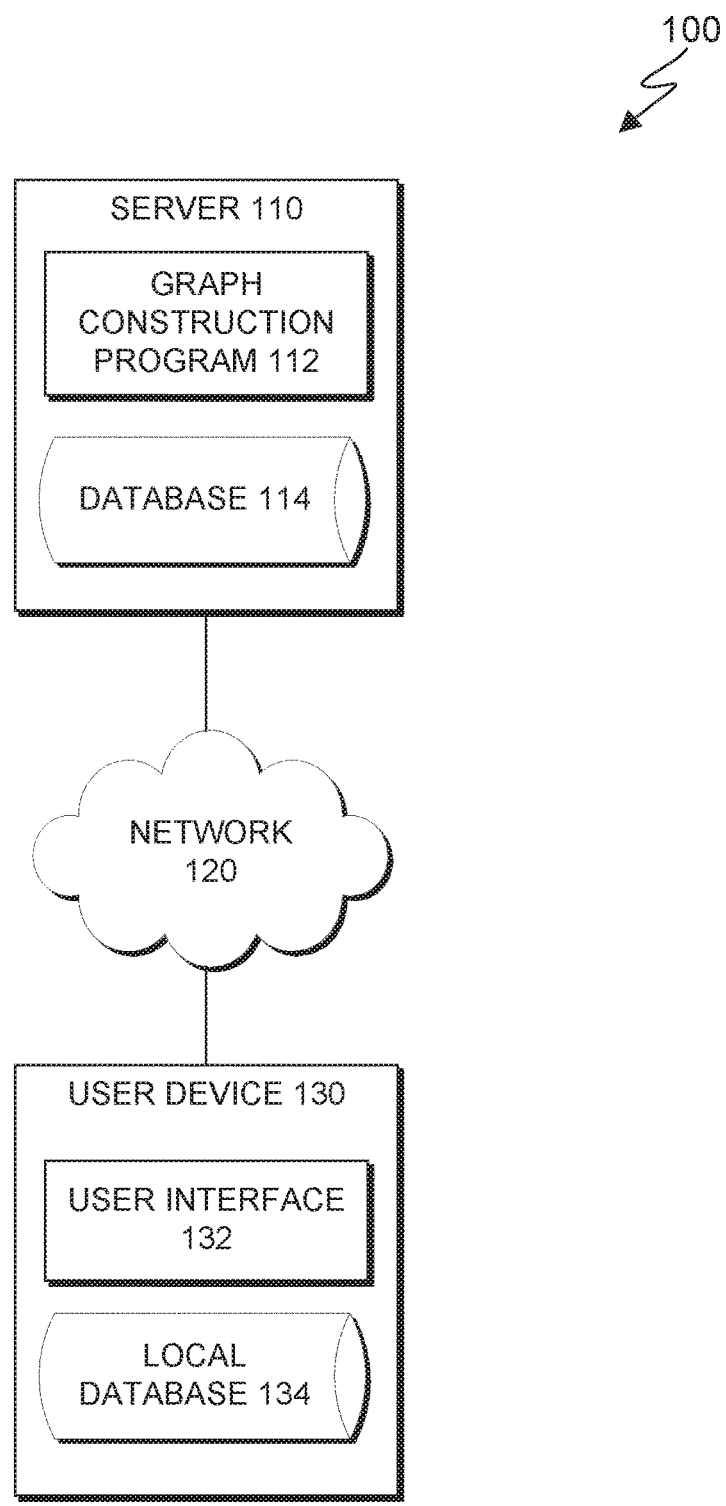
FIG. 1 depicts a functional block diagram illustrating a data processing environment, in accordance with an embodiment of the present invention.

Embodiments of the present invention recognize that the analysis of modern datum, such as electronic health records, requires an understanding of the causal relations between relevant variables (in the case of electronic health records, e.g., age, sex, lab measurements, smoking status, etc.). Causal graphs are used to gain this understanding of the causal relations between relevant variables, but modern data sets may contain thousands of potentially relevant variables making it virtually impossible for human experts to build a causal graph manually.

Direct acyclic graphs (DAGs) are the simplest type of graph used in causal inference studies, but DAGs are not a realistic option because it is rarely possible to infer the single true causal DAG given observational data. If it can be assumed that all relevant confounders have been measured and that there is no selection bias, a complete partial DAG (CPDAG) can be constructed, which extends DAGs by also providing the possibility to use undirected edges, which reflect lack of knowledge regarding the directionality of some of the edges. If it cannot be assumed that all relevant confounders have been measured or that there is no selection bias, a maximal ancestral graph (MAG) or partial ancestral graph (PAG) can be constructed, which introduces additional edge types to reflect lack of knowledge regarding direct causal relations between pairs of variables.

There is no existing interactive method to construct causal graphs that accounts for these possible unmeasured confounding effects present in MAGs and PAGs. Additionally, existing methods assume that all variables are discrete or Gaussian, while embodiments of the present invention use non-parametric conditional independence tests, which allow handling any combination of variable types, which, as previously discussed, cannot be performed by human experts or existing systems that build causal graphs.

Thus, embodiments of the present invention recognize that there is a need for an approach that combines algorithmic graph construction with expert knowledge. In this manner, as discussed in greater detail herein, embodiments of the present invention provide a collaborative process conducted in several rounds to refine a causal graph, such as a CPDAG or a PAG, wherein within each round a confidence in each edge is depicted visually, an expert can make modifications, and an alert is displayed if data strongly contradicts a modification by the expert.

Additionally, embodiments of the present invention can generate an interactive display interface that displays the constructed graph. For example, embodiments of the present invention can generate an interface that overlays over the constructed graph and includes one or more graphical icons and editable data fields (e.g. toggle switches, drop down menus, etc.) that can refine the constructed graph.

Causal inference through embodiments of the present invention are relevant to studies that estimate the effect of an intervention on some outcome using observational data, for example, the effect of various diabetes second line drugs (i.e., a treatment) on levels of HbA1c (i.e., an outcome) using electronic health records. In another example, in the field of economics, embodiments of the present invention can be used to estimate the effect of some policy on gross domestic product (GDP) or unemployment rate. In yet another example, in the field of behavioral and social sciences, embodiments of the present invention can be used to estimate the effect of rehabilitation plans on re-incarceration. In yet another example, in the field of epidemiology, embodiments of the present invention estimate the effect of a vaccination on disease prevalence.

The present invention will now be described in detail with reference to the Figures.

FIG. 1 depicts a functional block diagram illustrating data processing environment 100, in accordance with an embodiment of the present invention. FIG. 1 provides only an illustration of one embodiment and does not imply any limitations with regard to the environments in which different embodiments may be implemented. In the depicted embodiment, data processing environment 100 includes server 110 and user device 130 interconnected over network 120. Data processing environment 100 may include additional computing devices, servers, computers, mobile devices, or other devices not shown.

Network 120 may be a local area network (LAN), a wide area network (WAN) such as the Internet, the public switched telephone network (PSTN), a mobile broadband network, such as a 4G and Long Term Evolution (LTE), any combination thereof, or any combination of connections and protocols that will support communications between server 110 and user device 130, in accordance with embodiments of the invention. Network 120 may include wired, wireless, or fiber optic connections.

Server 110 operates to run graph construction program 112 and has access to database 114. In an embodiment, server 110 may be a management server, an internet server, or any other electronic device or computing system capable of running a program and receiving and sending data. In other embodiments, server 110 may represent a server computing system utilizing multiple computers as a server system, such as in a cloud computing environment. In some embodiments, server 110 may be a laptop computer, tablet computer, netbook computer, personal computer (PC), a desktop computer, a smart phone, or any programmable electronic device. In the depicted embodiment, server 110 contains graph construction program 112 and database 114. Server 110 may include components as depicted and described in further detail with respect to FIG. 3.

Graph construction program 112 operates to construct and refine a causal graph through collaboration with a user, such as an expert. In an embodiment, graph construction program 112 receives observational data subject to a set of constraints and constructs a causal graph, such as a CPDAG or PAG, based on the observational data and set of constraints. In an embodiment, graph construction program 112 generates an interactive display interface that presents the constructed graph with a confidence in each edge of the causal graph visually depicted. In an embodiment, responsive to generating the interactive display interface, graph construction program 112 enables a user through the interactive display interface to modify the constraints, enter in new/additional constraints, or modify or define components of the graph, such as an edge. In an embodiment, graph construction program 112 modifies the causal graph based on the new or modified inputs by the user and presents the updated causal graph to the user. In an embodiment, graph construction program 112 alerts the user if a decision by the user, such as inserting an edge to the causal graph, is strongly contradicted by the observational data and/or graph data.

In an embodiment, graph construction program 112 has access to database 114 to store and retrieve the observational data, graph data, and graph constraints. In the depicted embodiment, graph construction program 112 resides on server 110. In another embodiment, graph construction program 112 may reside elsewhere within data processing environment 100 provided graph construction program 112 has access to database 114 and user device 130 has access to graph construction program 112.

Database 114 is a repository for observational data, graph data, and graph constraints. A database is an organized collection of data. Database 114 can be implemented with any type of storage device capable of storing data and configuration files that can be accessed and utilized by server 110, such as a database server, a hard disk drive, or a flash memory. In an embodiment, database 114 is accessed by graph construction program 112 to store the observational data, graph data, and graph constraints. In another embodiment, database 114 is accessed to use the observational data, graph data, and graph constraints. In the depicted embodiment, database 114 resides on server 110. In another embodiment, database 114 may reside elsewhere within data processing environment 100 provided graph construction program 112 has access to database 114.

User device 130 operates to run user interface 132 and house local database 134. In some embodiments, user device 130 may be a laptop computer, tablet computer, netbook computer, personal computer (PC), a desktop computer, a smart phone, or any programmable electronic device. In the depicted embodiment, user device 130 contains user interface 132 and local database 134. Local database 134 is a local repository for the observational data, graph data, and graph constraints. Local database 134 can be implemented with any type of storage device capable of storing data and configuration files that can be accessed and utilized by user device 130, such as a database server, a hard disk drive, or a flash memory. In an embodiment, local database 134 is accessed by graph construction program 112 to store the observational data, graph data, and graph constraints until graph construction program 112 can store them to database 114. In another embodiment, database 114 is accessed by graph construction program 112 to retrieve the observational data, graph data, and graph constraints. User device 130 may include components as depicted and described in further detail with respect to FIG. 3.

User interface 132 operates as a local user interface on user device 130 of graph construction program 112. In an embodiment, user interface 132 is a local mobile application user interface of graph construction program 112. In an embodiment, user interface 132 enables a user to enter the observational data and graph constraints for graph construction program 112. In an embodiment, user interface 132 enables a user to use tools for modifying a constructed graph included in an interactive display interface generated by graph construction program 112.

Figure 2:
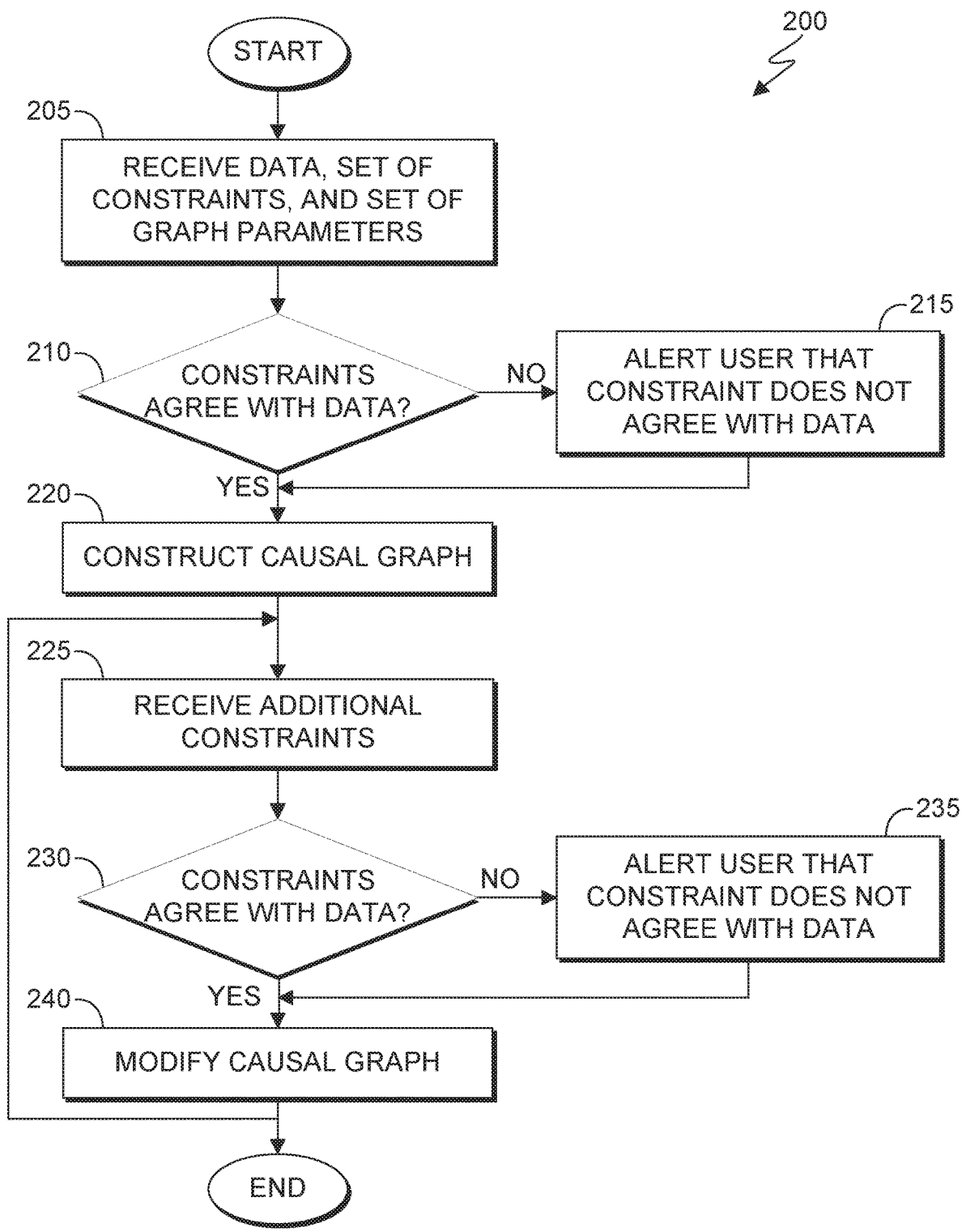
FIG. 2 depicts a flowchart depicting operational steps of a graph construction program executing within the data processing environment of FIG. 1, in accordance with an embodiment of the present invention.

FIG. 2 shows a flowchart depicting operational steps of graph construction program 112 executing within data processing environment 100 of FIG. 1, in accordance with an embodiment of the present invention. In the depicted embodiment, graph construction program 112 operates to construct and refine a causal graph through collaboration with a user, such as an expert. It should be appreciated that the process depicted in FIG. 2 illustrates one possible iteration of graph construction program 112 in which step 225 through step 240 may be iterated as many times as a user inputs additional constraints.

In step 205, graph construction program 112 receives observational data, a set of constraints, and a set of graph parameters. In an embodiment, graph construction program 112 receives observational data, such as electronic health records, from a user through user interface 132. In another embodiment, graph construction program 112 receives observational data from database 114 and/or local database 134. In other embodiments, graph construction program 112 can transmit a set of instructions to database 114 and/or local database 134 to send observational data. In yet other embodiments, graph construction program 112 can access one or more other public databases. In yet other embodiments, graph construction program 112 can access one or more other private databases that graph construction program 112 has been authorized to access.

In an embodiment, graph construction program 112 receives a set of constraints from a user through user interface 132. In another embodiment, graph construction program 112 receives a set of constraints from database 114 and/or local database 134. A set of constraints may include, but is not limited to, defining a conditional distribution for a node given its parents, specifying temporal-based constraints by assigning a relative time-stamp to one or more nodes in the graph, and identifying nodes that cannot be affected by others (e.g., age or ethnicity). In an embodiment, graph construction program 112 receives the set of constraints through an interactive display interface that includes a set of graphical icons and one or more fields for input (i.e. toggles, areas for text entry, drop down menus, etc.) that enable a user to input constraints.

In an embodiment, graph construction program 112 receives a set of graph parameters from a user through user interface 132. In another embodiment, graph construction program 112 receives a set of graph parameters from database 114 and/or local database 134. In an embodiment, graph construction program 112 receives the graph parameters through an interactive display interface that includes a set of graphical icons and one or more fields for input (i.e. toggles, areas for text entry, drop down menus, etc.) that enable a user to input or select graph parameters. Graph parameters may include, but are not limited to, specifying which nodes serve as treatment/outcome nodes, specifying a p-value cutoff, specifying whether to construct a CPDAG or a PAG, specifying the type of conditional independence tests to use (Gaussian, discrete, non-parametric, etc.), and specifying which algorithm to use (e.g., fast causal inference (FCI), really fast causal inference (RFCI), or FCI+ for a PAG).

In decision 210, graph construction program 112 determines whether the constraints agree with the observational data. In an embodiment, graph construction program 112 determines whether the initial set of constraints agree with the properties of the observational data. In an embodiment, graph construction program 112 performs conditional independence tests, specified in the graph parameters, to verify if a given constraint is in agreement with the empirical distribution of the observational data. In an embodiment, graph construction program 112 determines if the conditional independence test, specified in the graph parameters, returns a value that is above or below a predetermined threshold.

In an embodiment, graph construction program 112 infers a directionality of one or more undirected edges based on the received set of constraints and using edge orientation rules of the algorithm specified to use. For example, the main edge orientation rule for the Peter-Clarke (PC) algorithm used for CPDAGs is that for each triple of vertices X, Y, Z such that the pair X, Y and the pair Y, Z are each adjacent in G (the undirected graph) but the pair X, Z is not adjacent in G, orient X-Y-Z as X→Y←Z if and only if Y does not d-separate X and Y. In this embodiment, graph construction program 112 alerts the user when a directionality of one or more undirected edges is inferred. In this embodiment, graph construction program 112 enables the user to accept the newly suggested directionality of one or more undirected edges.

In an embodiment, graph construction program 112 derives one or more additional constraints based on the received set of constraints. In this embodiment, graph construction program 112 alerts the user when an additional constraint is derived. In this embodiment, graph construction program 112 enables the user to accept the newly suggested additional constraint.

If in decision 210, graph construction program 112 determines that the constraints agree with the observational data, then graph construction program 112 moves on to step 220, in which graph construction program 112 constructs the causal graph. If in decision 210, graph construction program 112 determines that the constraints do not agree with the observational data, then graph construction program 112 moves on to step 215, in which graph construction program 112 alerts the user.

In step 215, graph construction program 112 alerts the user that a constraint does not agree with the observational data. In an embodiment, graph construction program 112 alerts the user through a notification and/or pop-up display that a constraint does not agree with the observational data reflected in the graph. In another embodiment, graph construction program 112 sends an alert to another user, for example, another expert working on the same causal graph from a different user device (not shown). In an embodiment, graph construction program 112 displays a table of all the observed values of the relevant variables to allow the user to visually assess the empirical distribution of the table. For example, graph construction program 112 displays a table of the observed values of the two nodes whose edge was constrained by the user and the parents of these nodes. In an embodiment, graph construction program 112 enables the user to decide either to retract the constraint that does not agree or to enforce the constraint despite being in violation with the observational data.

In step 220, graph construction program 112 constructs a causal graph. In an embodiment, graph construction program 112 constructs a causal graph based on the received observational data, set of constraints (and any derived constraints), and set of graph parameters. For example, if a graph parameter specifies to construct a CPDAG, graph construction program 112 constructs a CPDAG using PC algorithm. In another example, if the graph parameters specify to construct a PAG using the FCI algorithm, graph construction program 112 constructs a PAG using the FCI algorithm.

In an embodiment, graph construction program 112 displays the constructed graph. In an embodiment, graph construction program 112 shows in the display all nodes grouped such that a minimum number of edges overlap each other, the confidence in each edge through its thickness determined according to the maximal p-value obtained across all conditional independence tests, edges colored if they are on a confounding path, certain nodes clearly marked, and nodes colored according to a relation to other nodes. For example, graph construction program 112 shows in the display treatment and outcome nodes clearly marked with a tag and nodes colored according to their relation to the treatment or outcome nodes. In another example, graph construction program 112 colors and/or highlights edges yellow that are on a confounding path.

In another embodiment, graph construction program 112 generates an interactive display interface that allows a user to directly modify the constructed graph. In an embodiment, the interactive display interface includes, but is not limited to, a set of graphical icons and one or more fields for input (i.e. toggles, areas for text entry, drop down menus, etc.) that enable a user to define, delete, or modify constraints of the constructed graph. In an embodiment, graph construction program 112 generates an interactive display interface that displays the constructed graph. In an embodiment, graph construction program 112 generates an interactive display interface that overlays the constructed graph. In another embodiment, graph construction program 112 generates an interactive display interface as a standalone interface to enable a user to directly modify the constructed graph. For example, embodiments of the present invention can generate an interface that overlays over the constructed graph and includes one or more graphical icons and editable data fields (e.g. toggle switches, drop down menus, etc.) that can refine the constructed graph.

In step 225, graph construction program 112 receives additional constraints. In an embodiment, graph construction program 112 receives additional constraints from the user through user interface 132. In an embodiment, graph construction program 112 receives additional constraints from the user through the interactive interface. In an embodiment, graph construction program 112, through user interface 132 and/or the interactive display interface, enables a user to define, delete, or modify constraints in the constructed graph. An additional constraint may include, but is not limited to, adding an edge between two nodes, deleting an edge between two nodes, flipping a direction of an edge, removing directionality of an edge, adding directionality to an existing edge, defining a conditional distribution for a node given its parents, assigning a relative time-stamp to nodes such that there can be no directed edge from a node to another node with an earlier timestamp, and identifying nodes that cannot be affected by others (e.g., age or ethnicity).

In an embodiment, graph construction program 112 infers a directionality of one or more undirected edges based on the received additional constraints and using edge orientation rules of the algorithm specified to use. For example, the main edge orientation rule for the Peter-Clarke (PC) algorithm used for CPDAGs is that for each triple of vertices X, Y, Z such that the pair X, Y and the pair Y, Z are each adjacent in G (the undirected graph) but the pair X, Z is not adjacent in G, orient X-Y-Z as X→Y←Z if and only if Y does not d-separate X and Y. In this embodiment, graph construction program 112 alerts the user when a directionality of one or more undirected edges is inferred. In this embodiment, graph construction program 112 enables the user to accept the newly suggested directionality of one or more undirected edges.

In an embodiment, graph construction program 112 derives one or more additional constraints based on the received additional constraints. In this embodiment, graph construction program 112 alerts the user when an additional constraint is derived. In this embodiment, graph construction program 112 enables the user to accept the newly suggested additional constraint.

In decision 230, graph construction program 112 determines whether the constraints agree with the observational data. In an embodiment, graph construction program 112 determines whether the additional constraints agree with the properties of the observational data and graph data. In an embodiment, graph construction program 112 performs conditional independence tests, specified in the graph parameters, to verify if a given constraint is in agreement with the empirical distribution of the observational data. In an embodiment, graph construction program 112 determines if the conditional independence test, specified in the graph parameters, returns a value that is above or below a predetermined threshold.

If in decision 230, graph construction program 112 determines that the constraints agree with the observational data, then graph construction program 112 moves on to step 240, in which graph construction program 112 modifies the causal graph. If in decision 230, graph construction program 112 determines that the constraints do not agree with the observational data, then graph construction program 112 moves on to step 235, in which graph construction program 112 alerts the user.

In step 235, graph construction program 112 alerts the user that a constraint does not agree with the observational data. In an embodiment, graph construction program 112 alerts the user through a notification and/or pop-up display that a constraint does not agree with the observational data reflected in the graph. In another embodiment, graph construction program 112 sends an alert to another user, for example, another expert working on the same causal graph from a different user device (not shown). In an embodiment, graph construction program 112 displays a table of all the observed values of the relevant variables to allow the user to visually assess the empirical distribution of the table. For example, graph construction program 112 displays a table of the observed values of the two nodes whose edge was modified by the user and the parents of these nodes. In an embodiment, graph construction program 112 enables the user to decide either to retract the constraint that does not agree or to enforce the constraint despite being in violation with the observational data.

In step 240, graph construction program 112 modifies the causal graph. In an embodiment, graph construction program 112 modifies the causal graph based on the received additional constraints and/or additional graph parameters. In an embodiment, graph construction program 112 displays the modified graph. In an embodiment, graph construction program 112 shows in the display all nodes grouped such that a minimum number of edges overlap each other, the confidence in each edge through its thickness determined according to the maximal p-value obtained across all conditional independence tests, edges colored if they are on a confounding path, certain nodes clearly marked, and nodes colored according to a relation to other nodes. For example, graph construction program 112 shows in the display treatment and outcome nodes clearly marked and nodes colored according to their relation to the treatment or outcome nodes.

In an embodiment, graph construction program 112 determines if there are additional constraints. In an embodiment, graph construction program 112 determines if there are additional constraints by sending a prompt to the user through user interface 132 asking if there are additional constraints. In other embodiments, graph construction program 112 determines whether there are additional constraints in response to receiving an indication from user interface 132. For example, a user can select a graphical icon or input in an editable field of the interactive display interface created by graph construction program 112 to modify the constructed graph. Accordingly, using user interface 132, a user can transmit an additional constraint to graph construction program 112. In an embodiment, graph construction program 112 iterates step 225 through step 240 each time additional constraints are input by the user.

In an embodiment, graph construction program 112 presents the final causal graph. In an embodiment, graph construction program 112 displays the final causal graph to the user on user device 130 through user interface 132. In an embodiment, graph construction program 112 shows in the display all nodes grouped such that a minimum number of edges overlap each other, the confidence in each edge through its thickness determined according to the maximal p-value obtained across all conditional independence tests, edges colored if they are on a confounding path, certain nodes clearly marked, and nodes colored according to a relation to other nodes. For example, graph construction program 112 shows in the display treatment and outcome nodes clearly marked and nodes colored according to their relation to the treatment or outcome nodes.

Accordingly, embodiments of the present invention provide a collaborative process conducted in several rounds to refine a causal graph, such as a CPDAG or a PAG, wherein within each round a confidence in each edge is depicted visually, an expert can make modifications, and an alert is displayed if data strongly contradicts a modification by the expert. Additionally, embodiments of the present invention generate an interactive display interface that allows a user to directly modify the constructed graph.

Figure 3:
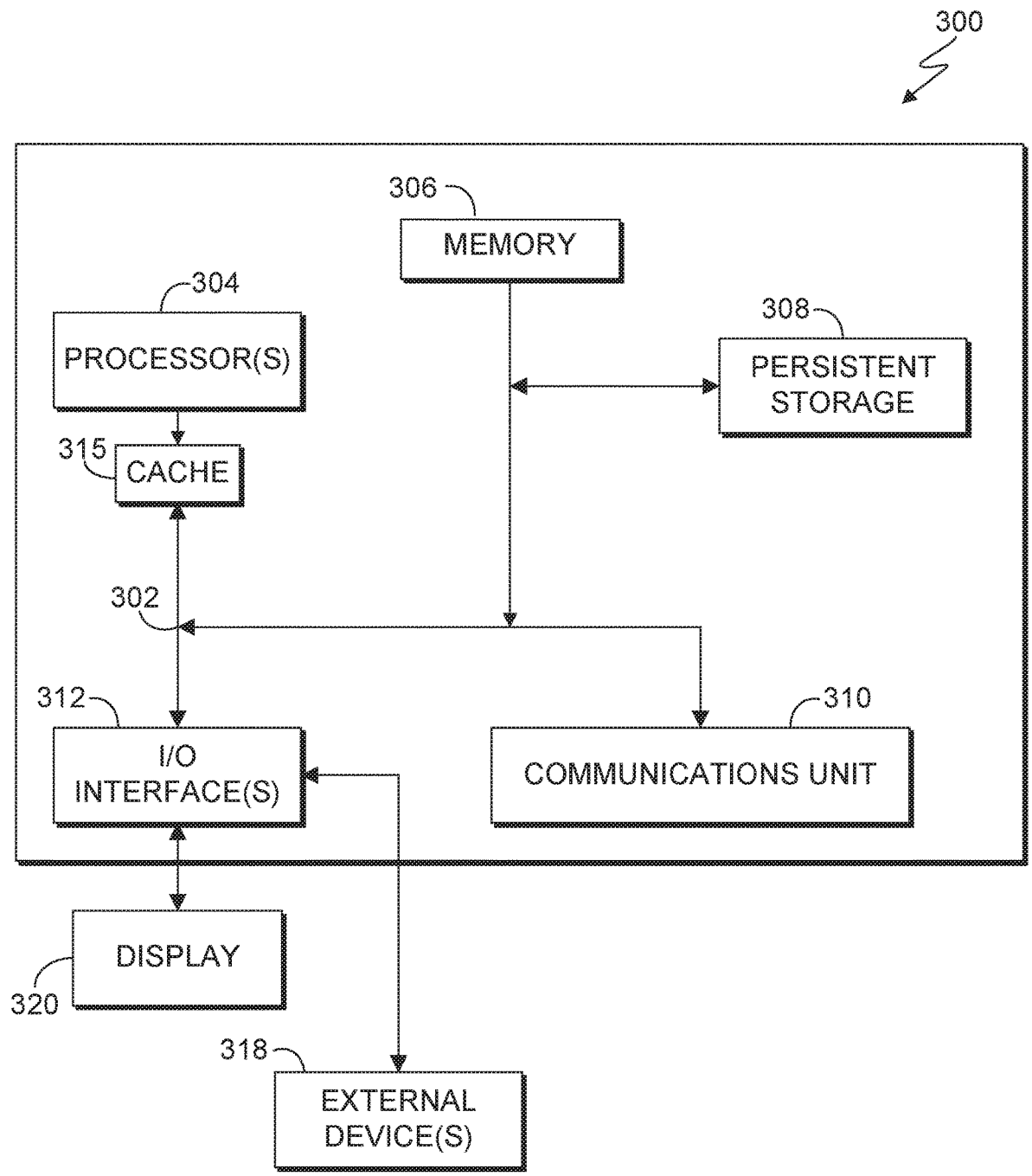
FIG. 3 depicts a block diagram of components of a computing device of data processing environment, in accordance with an embodiment of the present invention.

FIG. 3 is a block diagram depicting components of a computer 300, such as server 110 and user device 130, suitable for graph construction program 112. FIG. 3 displays computer 300, one or more processor(s) 304 (including one or more computer processors), communications fabric 302, memory 306, cache 316, persistent storage 308, communications unit 310, I/O interfaces 312, display 320, and external devices 318. It should be appreciated that FIG. 3 provides only an illustration of one embodiment and does not imply any limitations with regard to the environments in which different embodiments may be implemented. Many modifications to the depicted environment may be made.

As depicted, computer 300 operates over communications fabric 302, which provides communications between cache 316, computer processor(s) 304, memory 306, persistent storage 308, communications unit 310, and input/output (I/O) interface(s) 312. Communications fabric 302 may be implemented with any architecture suitable for passing data and/or control information between processors 304 (e.g., microprocessors, communications processors, and network processors, etc.), memory 306, external devices 318, and any other hardware components within a system. For example, communications fabric 302 may be implemented with one or more buses or a crossbar switch.

Memory 306 and persistent storage 308 are computer readable storage media. In the depicted embodiment, memory 306 includes a random access memory (RAM). In general, memory 306 may include any suitable volatile or non-volatile implementations of one or more computer readable storage media. Cache 316 is a fast memory that enhances the performance of computer processor(s) 304 by holding recently accessed data, and data near accessed data, from memory 306.

Program instructions for graph construction program 112 may be stored in persistent storage 308 or in memory 306, or more generally, any computer readable storage media, for execution by one or more of respective computer processors 304 via cache 316. Persistent storage 308 may include a magnetic hard disk drive. Alternatively, or in addition to a magnetic hard disk drive, persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Graph construction program 112 may be downloaded to persistent storage 308 through communications unit 310. In the context of some embodiments of the present invention, the source of the various input data may be physically remote to computer 300 such that the input data may be received and the output similarly transmitted via communications unit 310.

I/O interface(s) 312 allows for input and output of data with other devices that may operate in conjunction with computer 300. For example, I/O interface 312 may provide a connection to external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto persistent storage 308 via I/O interface(s) 312. I/O interface(s) 312 may similarly connect to display 320. Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), a mobile broadband network, such as a 4G and Long Term Evolution (LTE), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for constructing causal graphs, the method comprising:
    receiving, by one or more processors, data subject to a first set of constraints and a set of graph parameters, wherein the first set of constraints comprises defining a conditional distribution for a node given its parents, specifying temporal based-constraints by assigning a relative time-stamp to one or more nodes, and identifying one or more nodes that cannot be affected by other nodes, wherein the set of graph parameters comprises specifying a type of graph to construct, specifying a type of conditional independence test to use, specifying an algorithm to use for constructing the causal graph, and specifying a p-value cutoff, wherein the type of graph to construct comprises a complete partial direct acyclic graph and a partial ancestral graph, wherein a complete partial direct acyclic graph is selected when it can be assumed that relevant confounders have been measured and there is no selection bias, and wherein a partial ancestral graph is selected when it cannot be assumed that relevant confounders have been measured or there is no selection bias;
    constructing, by one or more processors, a causal graph based on the data, the first set of constraints, and the set of graph parameters;
    generating, by one or more processors, an interactive display interface for the constructed causal graph; and
    refining, by one or more processors, the constructed causal graph using the interactive display interface.

2. The method of claim 1, wherein refining the constructed causal graph using the interactive display interface further comprises:
    receiving, by one or more processors, a second set of constraints from a user through a user interface;
    determining, by one or more processors, that a constraint of the second set of constraints conflicts with the data;

modifying, by one or more processors, the causal graph based on the second set of constraints; and generating, by one or more processors, the modified causal graph in the interactive display interface.

3. The method of claim 2, further comprising:

alerting, by one or more processors, the user that the constraint of the second set of constraints conflicts with the data; and enabling, by one or more processors, the user to take an action related to the constraint of the second set of constraints, wherein the action is selected from the group consisting of retracting the constraint of the second set of constraints and enforcing the constraint of the second set of constraints.

4. The method of claim 2, wherein the second set of constraints comprises at least one of adding a new constraint, modifying a constraint from the first set of constraints, and deleting a constraint from the first set of constraints.

5. The method of claim 2, wherein determining whether the second set of constraints conflict with the data is based on applying a non-parametric conditional independence test.

6. The method of claim 1, wherein generating an interactive display interface for the constructed causal graph further comprises:

presenting, by one or more processors, the causal graph to the user through the interactive display interface; and displaying, by one or more processors, a confidence in each edge of the causal graph, wherein the confidence in each edge is visually depicted as a thickness.

7. A computer program product for constructing causal graphs, the computer program product comprising:

one or more computer readable storage mediums and program instructions stored on the one or more computer readable storage mediums, the program instructions comprising:

program instructions to receive data subject to a first set of constraints and a set of graph parameters, wherein the first set of constraints comprises defining a conditional distribution for a node given its parents, specifying temporal based-constraints by assigning a relative time-stamp to one or more nodes, and identifying one or more nodes that cannot be affected by other nodes, wherein the set of graph parameters comprises specifying a type of graph to construct, specifying a type of conditional independence test to use, specifying an algorithm to use for constructing the causal graph, and specifying a p-value cutoff, wherein the type of graph to construct comprises a complete partial direct acyclic graph and a partial ancestral graph, wherein a complete partial direct acyclic graph is selected when it can be assumed that (1) relevant confounders have been measured and (2) there is no selection bias, and wherein a partial ancestral graph is selected when it cannot be assumed that (1) relevant confounders have been measured or (2) there is no selection bias;

program instructions to construct a causal graph based on the data, the first set of constraints, and the set of graph parameters;

program instructions to generate an interactive display interface for the constructed causal graph; and program instructions to refine the constructed causal graph using the interactive display interface.

8. The computer program product of claim 7, wherein the program instructions to refine the constructed causal graph using the interactive display interface further comprise:

program instructions to receive a second set of constraints from a user through a user interface;

program instructions to determine that a constraint of the second set of constraints conflicts with the data;

program instructions to modify the causal graph based on the second set of constraints; and program instructions to generate the modified causal graph in the interactive display interface.

9. The computer program product of claim 8, further comprising:

program instructions to alert the user that the constraint of the second set of constraints conflicts with the data; and program instructions to enable the user to take an action related to the constraint of the second set of constraints, wherein the action is selected from the group consisting of retracting the constraint of the second set of constraints and enforcing the constraint of the second set of constraints.

10. The computer program product of claim 8, wherein the second set of constraints comprises at least one of adding a new constraint, modifying a constraint from the first set of constraints, and deleting a constraint from the first set of constraints.

11. The computer program product of claim 8, wherein the program instructions to determine whether the second set of constraints conflict with the data is based on applying a non-parametric conditional independence test.

12. The computer program product of claim 7, wherein the program instructions to generate an interactive display interface for the constructed causal graph further comprise:

program instructions to present the causal graph to the user through the interactive display interface; and program instructions to display a confidence in each edge of the causal graph, wherein the confidence in each edge is visually depicted as a thickness.

13. A computer system for constructing causal graphs, the computer system comprising:

one or more computer processors;

one or more computer readable storage media;

program instructions stored on the computer readable storage media for execution by at least one of the one or more processors, the program instructions comprising:

program instructions to receive data subject to a first set of constraints and a set of graph parameters, wherein the first set of constraints comprises one or more of defining a conditional distribution for a node given its parents, specifying temporal based-constraints by assigning a relative time-stamp to one or more nodes, and identifying one or more nodes that cannot be affected by other nodes, wherein the set of graph parameters comprises specifying a type of graph to construct, specifying a type of conditional independence test to use, specifying an algorithm to use for constructing the causal graph, and specifying a p-value cutoff, wherein the type of graph to construct comprises a complete partial direct acyclic graph and a partial ancestral graph, wherein a complete partial direct acyclic graph is selected when it can be assumed that (1) relevant confounders have been measured and (2) there is no selection bias, and wherein a partial ancestral graph is selected when it cannot be assumed that (1) relevant confounders have been measured or (2) there is no selection bias;

program instructions to construct a causal graph based on the data, the first set of constraints, and the set of graph parameters;

program instructions to generate an interactive display interface for the constructed causal graph; and program instructions to refine the constructed causal graph using the interactive display interface.

14. The computer system of claim 13, wherein the program instructions to refine the constructed causal graph using the interactive display interface further comprise:

program instructions to receive a second set of constraints from a user through a user interface;

program instructions to determine that a constraint of the second set of constraints conflicts with the data;

program instructions to modify the causal graph based on the second set of constraints; and program instructions to generate the modified causal graph in the interactive display interface.

15. The computer system of claim 14, further comprising:

program instructions to alert the user that the constraint of the second set of constraints conflicts with the data; and program instructions to enable the user to take an action related to the constraint of the second set of constraints, wherein the action is selected from the group consisting of retracting the constraint of the second set of constraints and enforcing the constraint of the second set of constraints.

16. The computer system of claim 14, wherein the program instructions to determine whether the second set of constraints conflict with the data is based on applying a non-parametric conditional independence test.

17. The computer system of claim 13, wherein the program instructions to generate an interactive display interface for the constructed causal graph further comprise:

program instructions to present the causal graph to the user through the interactive display interface; and program instructions to display a confidence in each edge of the causal graph, wherein the confidence in each edge is visually depicted as a thickness.

* * * * *